Feb. 7, 1956 F. L. B. MILLER 2,733,580
FLEXIBLE THRUST COUPLING
Filed Oct. 5, 1953 4 Sheets-Sheet 1

INVENTOR.
Fred L. B. Miller

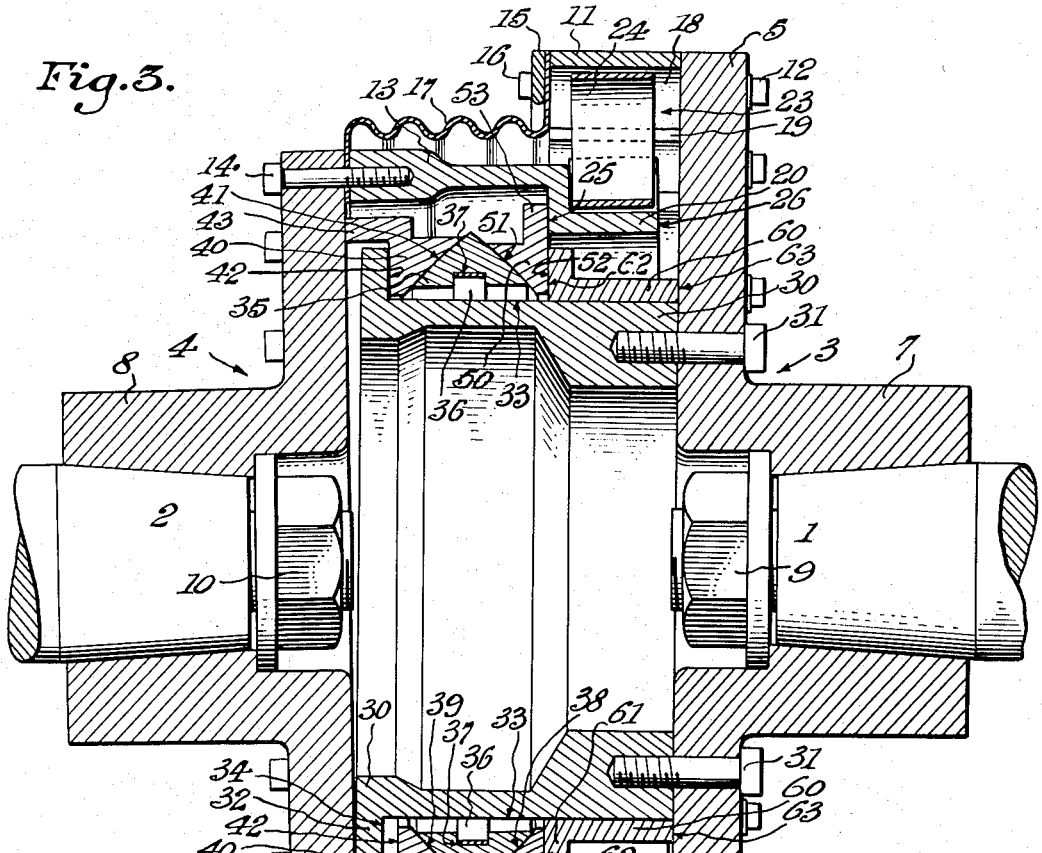

United States Patent Office 2,733,580
Patented Feb. 7, 1956

2,733,580

FLEXIBLE THRUST COUPLING

Fred L. B. Miller, Portland, Oreg.

Application October 5, 1953, Serial No. 384,357

5 Claims. (Cl. 64—15)

(Granted under Title 35, U. S. Code (1952), sec. 266)

The invention described herein may be manufactured and used by or for the Government for governmental purposes, without payment to me of any royalty thereon.

The present invention relates to a flexible coupling for drive elements which will permit resilient transmission of torque and which also will permit angular and parallel misalignment of the driving and driven elements, and which may be used in systems in which a thrust is present.

This invention is particularly useful in cases in which thrust between shafts of a drive train is present or necessary, the invention having particular applicability in the drive trains of small power boats which do not have thrust bearings on their propeller shafts, and which require resilient mountings for their engines to reduce vibrations; but the invention may be applied to other uses such as ships or well drilling rigs.

An important object of this invention is to provide a flexible coupling providing resilient means for torque transmission.

Another object of this invention is to provide a flexible coupling between drive elements one of which exerts a thrust relative to the other.

Another object of this invention is to provide a flexible coupling which will permit relative parallel displacement or offsetting between drive shafts connected by the coupling.

Still another object of this invention is to provide a flexible coupling which also will permit relative angular misalignment or offsetting between drive shafts connected thereby, as well as the aforesaid parallel offsetting between the drive shafts.

Other objects and advanatges of the invention will be apparent as the description proceeds and the features of novelty will be pointed out in particularity in the appended claims.

Briefly, in accordance with this invention, there is provided a coupling for the flexible connection of two elements of a drive train, such as, for example, a driving shaft and a driven shaft, which have two opposed flanged elements or plate members, each of which is adapted for attachment to a shaft. The flanged elements are arranged in spaced relationship with their flanges generally parallel. One flanged element has secured thereto a torque ring and the other a torque cylinder extending toward the opposed flanged element so that the two may overlap. The torque ring and cylinder at their area of overlap are provided with opposed recesses into which are placed loosely fitting elastic rings to provide a resilient driving connection. One of the flanged elements also carries a flanged thrust cylinder extending toward the other flanged element and supporting a spherically surfaced alignment ring spring-tensioned on the thrust cylinder. There are also provided outer alignment rings having portions of their inner surfaces of spherical shape to conform to the outer spherical surfaces of the first alignment ring on which they bear and a thrust ring mounted on the thrust cylinder which serves to space the alignment rings from the flange to which the thrust cylinder is secured. Relative movements of the alignment and thrust elements absorb the thrust exerted by one flanged element relative to the other and permit both parallel and angular misalignment between the flanged elements and the shafts or other elements to which they are attached. The alignment rings, by angular displacement relative to one another with spherical surfaces in contact, act somewhat on the principle of a ball and socket.

In the accompanying drawings, forming a part of this specification, and wherein like numerals are employed to designate like parts throughout the same:

Fig. 1 is a vertical cross-section of an exemplary embodiment of the invention in a position of axial alignment and absence of thrust;

Fig. 3 is also a vertical cross-section of the coupling similar to Fig. 1, showing a position of both angular axial misalignment and presence of thrust;

Fig. 4 is a detailed fragmentary section taken on the line IV—IV of Fig. 1;

Fig. 5 is a detailed fragmentary section taken on the line V—V of Fig. 1; and

Figure 2:
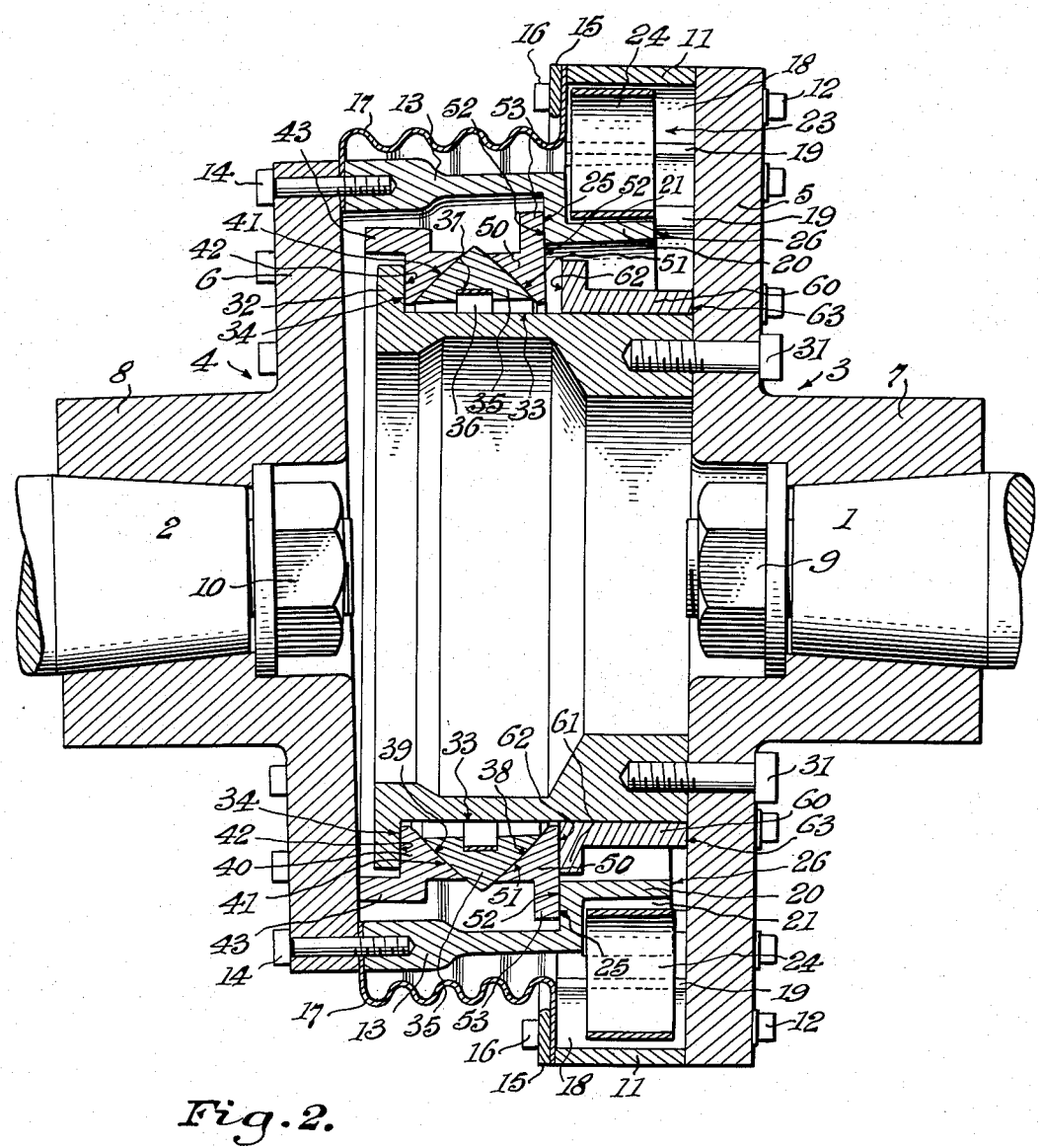
Fig. 2 is a vertical cross-section similar to Fig. 1, in which no thrust is exerted, but showing the coupling in a position of angular axial misalignment.
Figure 6:
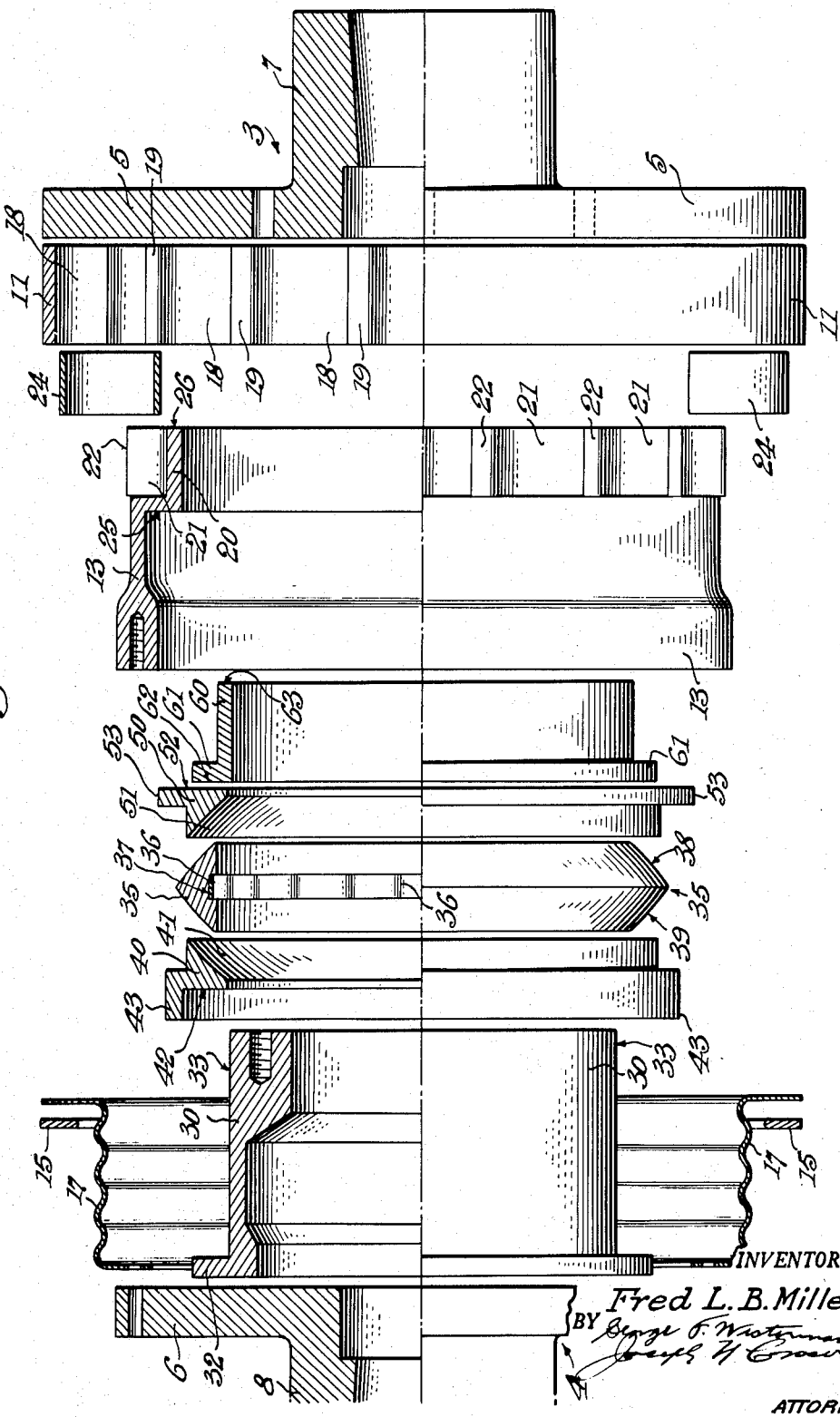
Fig. 6 is an exploded elevation of the coupling shown in Fig. 1 with the elements thereof shown partially in vertical section.

In the drawings, wherein for purposes of illustration, there is shown a preferred illustrative embodiment of the invention, shafts 1 and 2 are elements of a drive train into which the flexible coupling is placed. The flexible coupling includes flanged elements or plate members 3 and 4 having flanges or plates 5 and 6 and hubs 7 and 8, respectively, for attachment to the shafts by means of nuts 9 and 10. The plate members 3 and 4 are arranged with the plates 5 and 6 thereof facing each other in spaced relationship. Torque ring 11 is secured to the periphery of plate 5 by means of bolts 12 and extends toward plate 6. Torque cylinder 13 is secured to the periphery of plate 6, which is of lesser diameter than plate 5, by means of bolts 14 and extends toward plate 5 so that the extremity of the cylinder is overlapped by torque ring 11. A cylindrical bellows 17 is secured between torque cylinder 13 and plate 6 at one edge and to torque ring 11 by retaining ring 15 and bolts 16 at the other edge to effect a grease seal of the unit. The interior of torque ring 11 is formed with a series of semi-cylindrical recesses 18, separated by walls 19. That portion of the end of torque cylinder 13 remote from plate 6, and which is covered by torque ring 11, is reduced in diameter at 20 and is provided with bearing surfaces 25 and 26.

The exterior of the reduced portion 20 of torque cylinder 13 is formed with a series of semi-cylindrical recesses 21 defined by walls 22. Recesses 18 and 21 are equal in number and directly opposed so as to form a series of cylindrical chambers 23, housing elastic rings 24, which form driving connections between the torque ring 11 and torque cylinder 13, and which are normally perfect right cylindrical pieces of resilient material of maximum diameter to be contained within the space defined by the exposed shoulders of walls 19 and 22 within chambers 23 and are substantially shorter than chambers 23 for a purpose to be made apparent later. However chambers 23 are not perfectly cylindrical, but are distorted by the insertion of a central zone or segment defined by the spacing between opposed walls 19 of ring 11 and walls 22 of cylinder 13, so that elastic rings 24 are spaced from ring 11 and cylinder 13 at the center portions of the semi-cylindrical recesses 18 and 21, respectively. Elastic rings or key members 24 operatively interconnect plate members 3 and 4 for transmission of rotational movement and provide a resilient connection because sudden changes in the torque or speed of rotation by either plate member is accompanied by a distortion of the elastic rings as they are forced into somewhat elliptical configurations by the forces exerted by diametrically opposite shoulders of walls 19 and 22.

Angular displacement between plate members 3 and 4 about the axis of rotation is limited by the decrease in diameter of the elastic rings 24 along the line of compressive force that is obtained by the increase in diameter across the depth of recesses 18 and 21 as the elastic rings are seated entirely against the interior walls of recesses 18 and 21.

Universal movement including both angular and parallel misalignment of shafts 1 and 2 is provided for by a series of parts operating somewhat on the principle of a ball and socket joint and include a thrust cylinder 30 attached at one end to the inner surface of plate 5 of plate member 3 by means of bolts 31, and which extends toward plate 6 of plate member 4, but terminates in spaced relation thereto in peripheral flange 32. This thrust cylinder 30 is also provided with an exterior cylindrical bearing surface 33. A conical inner alignment ring 35 has an inner cylindrical surface of greater diameter than bearing surface 33 but less than the diameter of the periphery of flange 32 and is supported on bearing surface 33 by the corrugated biasing member or spring 36, which is retained in position by its intermittent fit within groove 37 in the inner surface of inner alignment ring 35. The exterior of inner alignment ring 35 forms two bearing surfaces 38 and 39 which are spherical zoned surfaces or segments. Outer alignment rings 40 and 50, also of greater inner diameter than the diameter of bearing surface 33, are placed on either side of inner alignment ring 35, and each bears on one of the external spherical segmental bearing surfaces of ring 35. Outer alignment ring 40 is provided with a spherical bearing surface 41 of the same radius of curvature as surface 39, and is formed also with a planar bearing surface 42 and cylindrical flange 43 of greater diameter and length than the periphery of flange 32 of thrust cylinder 30 over which it extends, the flange 32 engaging with the planar surface 42.

Outer alignment ring 50 is provided with a spherical bearing surface 51 of the same radius of curvature as surface 38 of alignment ring 35, and the ring 50 also is formed with a planar bearing surface 52 and annular flange 53, the periphery of which is of greater diameter than the reduced portion 20 of torque cylinder 13, the purpose of which will hereinafter be explained. Thrusting 60, of such internal diameter as to fit on bearing surface 33 in frictional contact, is mounted on thrust cylinder 30 between the outer alignment ring 50 and plate 5, and is provided with an annular flange 61 and annular bearing surfaces 62 and 63.

In a position of axial alignment of shafts 1 and 2 and in which plates 5 and 6 are in positions of maximum separation because of absence of thrust of either shaft toward the other, as shown in Fig. 1, the outer alignment rings 40 and 50 are concentric with inner alignment ring 35, thrust cylinder 30 and the shafts. The outer alignment rings 40 and 50 bear on inner alignment ring 35 with the spherical zoned surfaces thereof in contact. Outer alignment ring 40 also bears on flange 32 of thrust cylinder 30 with annular bearing surfaces 42 and 34 in contact, while outer alignment ring 50 also bears on torque cylinder 13 at the offset thereof with bearing surfaces 52 and 25 in contact, so that flange 32, alignment rings 40, 35 and 50 and torque cylinder 13 at surface 25 of offset portion 20, are in successive contact, and the alignment group is under compression to prevent separation of plates 5 and 6 to provide a stabilizing or dampening effect on the coupling and the drive train in which it is included. Thrust ring 60 may also bear against outer alignment ring 50 with bearing surfaces 52 and 62 in contact.

The coupling may assume a position of angular axial misalignment as shown in the extreme in Fig. 2 by relative movement of parts and particularly by a relative movement among the inner and the outer alignment rings. As shown in Fig. 2, no thrust is exerted by the shafts 1 and 2 which are in angular axial misalignment and accompanied by a lack of parallelism between plates 5 and 6. The tipping of plates 5 and 6 with respect to each other may also be accompanied by contacts between cylindrical flange 43 and plate 6, and between bearing surface 63 and plate 5 at the constricted side of the coupling and may be accompanied by a separation of outer alignment ring 50 and thrust ring 60 at surfaces 52 and 62 and a contact between surface 63 of thrust ring 60 and plate 5 at the extended side of the coupling with contacts between surface 63 and plate 5 and between flange 43 and plate 6 occurring only on extreme misalignment.

The coupling may also assume a position of angular axial misalignment accompanied by the exertion of thrust by one shaft toward the other as shown in Fig. 3. The position illustrated in Fig. 3 is obtained by a relative movement of parts, particularly among the inner and outer alignment rings, and is accompanied by a lack of parallelism between plates 5 and 6 which are forced toward each other as a result of the thrust exerted by one of the shafts. The relative position of various elements may differ from that illustrated in Fig. 2 most noticeably by the continuous contact among plate 6, alignment rings 40, 35 and 50, thrust ring 60 and plate 5, by the separation of bearing surfaces 34 and 42 and of surfaces 25 and 52 at the constricted side of the coupling, and by the contact between flange 43 and plate 6 and the contact between outer alignment ring 50 and thrust ring 60 at bearing surfaces 52 and 62 at the extended side of the coupling.

The coupling may also assume various other positions which are not illustrated but which readily may be predicted from those illustrated, and including a position of axial alignment between shafts 1 and 2 comparable to Fig. 1 but in which thrust sufficient to force plates 5 and 6 toward each other is present and positions in which a parallel axial misalignment between shafts 1 and 2 exists, either with or without the exertion of thrust of one shaft toward the other.

Relative movement among torque cylinder 13, resilient cylinders 24 and torque ring 11 indicated by the various relative positions among these elements as illustrated in Fig. 1, Fig. 2 and Fig. 3, indicates that torque transmission between the shafts remains smooth and uninterrupted, irrespective of various and changing relative positions of shafts 1 and 2. This arrangement also permits the offset portion 20 of torque cylinder 13 and torque ring 11 to depart from the parallel arrangement shown in Fig. 1 resulting from a tipping of either plate 5 or 6. It must be noted in this respect that the offset portion 20 of torque cylinder 13, and therefore the minimum length of substantially elliptical chambers 23 is sufficiently longer, in the extreme instances of deflection and compression as shown in the lower portion of Fig. 3, than resilient cylinders 24 so that no binding occurs at the ends of cylinders 24.

The group of alignment elements comprising thrust cylinder 30, outer alignment rings 40 and 50, inner alignment ring 35, and the offset portion of torque cylinder 13 at bearing surface 25, may operate comparably to either a ball and socket combination or as sliding blocks, depending upon the directional movement required by a particular movement of shafts 1 and 2 with respect to each other. When shafts 1 and 2 assume positions of axial misalignment, outer alignment rings 40 and 50 oscillate in curved paths parallel to the projection of a straight line upon the spherical bearing surfaces of inner alignment ring 35 so as to cause an angular movement of either shaft roughly about a point corresponding to the center of gyration of the more proximate spherical surface of inner alignment ring 35. Each alignment ring makes a complete oscillation in each revolution of the shafts. This arrangement however, permits results not available from an ordinary ball and socket structure not only because surfaces 25, 52, 34, 42, etc., provide bearing surfaces in excess of that of a cut out ball and socket but also because of the resilient mounting of inner alignment ring 35 on thrust cylinder 30 which permits ring 35 to move vertically as viewed in Fig. 1, thus shifting the center of its spherical surfaces away from the line of axial alignment of shafts 1 and 2. These movements may occur in cases of axial misalignment of the shafts and are dictated by the necessity of shortening the distance between the bearing surface 25 of offset portion 20 of torque cylinder 13 and annular bearing surface 34 of annular flange 32 of thrust cylinder 30 on the constricted side of the coupling as the bending occurs and are the equivalent of compressing one portion of inner alignment ring 35.

This is possible because the shortening of this distance on the constricted side is at least partially accompanied by a lengthening of the same distance on the extended side of the coupling and is obtained by opposite directional movements of the outer alignment rings with respect to the inner alignment ring, with the outer rings sliding on the spherical bearing surfaces of the inner alignment ring, and may be accompanied or aided by a tipping of inner alignment ring 35 away from its normal position perpendicular to thrust cylinder 30.

The alignment group may operate similar to a sliding block structure as shafts 1 and 2 assume positions of parallel axial misalignment, wherein the major portion of the distortion is absorbed by a sliding movement between outer alignment ring 50 and offset portion 20 of thrust cylinder 13 at bearing surfaces 52 and 25 along a diameter of those elements, and by movement of the alignment rings with respect to thrust cylinder 30 which is permited by the resilient mounting 36 of inner alignment ring 35.

Thrust of one shaft toward the other is absorbed by either a direct contact of parts as in the case of axial alignment or relative movement among the elements of the alignment group in the instance of angular axial misalignment between the shafts. The difference previously pointed out between the thrust and no thrust conditions of the coupling as illustrated in Fig. 2 and Fig. 3 is obtained by movements of the alignment rings with respect to each other as controlled by the space available for those elements at the constricted and extended sides, whether that space be limited by any combinations of offset portion 20, annular flange 32, annular flange 61 and plate 6. A dampening and steadying effect is obtained through the reaction of the opposite sides of the outer alignment rings against the other elements on which they bear to pressures exerted on those rings initially as the space in which they must be contained is varied.

Having thus described my invention, what I claim as new and wish to secure by Letters Patent is:

1. A flexible coupling for the interconnection of elements of a drive train, as for example a driving shaft and a driven shaft, comprising two opposed flanged elements each of which is attached to one of the shafts, the said flanged elements being in spaced relationship and having their flanges substantially parallel, one of the flanged elements being a torque element and the other flanged element being an alignment element, said torque element including a disc-shaped member having a series of externally directed semi-cylindrical recesses spaced about the periphery thereof, an overrunning ring member surrounding said disc-shaped member and being provided with inwardly directed semi-cylindrical recesses spaced about the interior thereof to correspond with the semi-cylindrical recesses of the disc-shaped member, and a plurality of resilient cylindrical members each located partially within a semi-cylindrical recess of the disc-shaped member and partially within a semi-cylindrical recess of the ring member to resiliently interconnect said latter members for torque transmission; said alignment element including overlapping cylindrical supporting members and a plurality of alignment rings between said cylindrical supporting members in frictional contact with one another and with said supporting members, said alignment rings having frictional contact among themselves on a plurality of spherical segmental surfaces, whereby axial misalignment of the supporting members will be absorbed by angular movements and displacements among the alignment rings and the cylindrical supporting members.

2. A flexible coupling for the interconnection of elements of a drive train, as for example a driving shaft and a driven shaft, comprising two opposed flanged plate members each of which is adapted for attachment to a shaft, said flanged plate members being in spaced relationship and having their flanges generally parallel; a torque cylinder secured to the face of each flanged plate member and extending toward the other flanged plate member in overlapping relationship with the other torque cylinder, said torque cylinders being provided at their area of overlap with opposed semi-cylindrical recesses to form substantially cylindrical recesses; a resilient cylinder in each cylindrical recess; the inner said torque cylinder having a portion of reduced diameter forming at the shoulder thereof a radial alignment bearing surface internally thereof; a thrust cylinder within the inner torque cylinder secured to the flanged element supporting the outer torque cylinder extending toward the flanged element supporting the inner torque cylinder in overlapping relation with the inner torque cylinder and terminating in an external circumferential flange; an inner alignment ring having spherical segmental external bearing surfaces spring-tensioned on the thrust cylinder; a pair of complementary outer alignment rings having spherical segmental internal alignment surfaces frictionally supported on the spherical bearing surfaces of said inner alignment ring and planar external bearing surfaces frictionally contacting said external circumferential flange of said thrust cylinder and said alignment bearing surface of said inner torque cylinder respectively; and a thrust ring mounted on said thrust cylinder between the flange element supporting the thrust cylinder and the more proximate outer alignment ring to maintain those two members in spaced relationship whereby angular movement of one flanged element about its axis of rotation is resiliently transmitted to the other flanged element by said resilient cylindrical members, and whereby axial displacement, in parallel and angular directions, selectively, between said flanged elements is permitted by corresponding relative movements between said alignment rings, thrust ring, thrust cylinder, and the torque cylinders.

3. A flexible coupling for the interconnection of elements of a drive train, as for example a driving shaft and a driven shaft, comprising two opposed flanged elements each of which is adapted for attachment to a shaft, said flanged elements being in spaced relationship and having their flanges generally parallel; a torque cylinder secured to the flange of each flanged element and extending toward the other flanged element in overlapping relationship, said torque cylinders being provided with opposed semi-cylindrical recesses, elastic cylindrical members, each partially within said opposed semi-cylindrical recesses interconnecting said torque cylinders, the inner torque cylinder having an offset portion forming an alignment bearing surface internally thereof; a thrust cylinder within the inner torque cylinder secured to the opposite flanged element extending therefrom in overlapping relationship with the inner torque cylinder and terminating with an external circumferential flange; an inner alignment ring having spherical segmental external bearing surfaces spring-tensioned on the thrust cylinder; and a pair of complementary outer alignment rings having spherical segmental internal bearing surfaces frictionally supported on the spherical bearing surfaces of said inner alignment ring and external planar bearing surfaces in frictional contact with said external circumferential flange of said thrust cylinder and said alignment bearing surface of said inner torque cylinder respectively, whereby angular movement of one flanged element about its axis is resiliently transmitted to the other flanged element by said elastic cylindrical members and whereby axial misalignment either parallel or angular of said flanged elements is compensated for by relative movement of said alignment rings, thrust ring, thrust cylinder and the torque cylinders.

4. Flexible coupling construction for transmitting motion between a pair of oppositely disposed moving members, one of which is a driving member and the other of which is a driven member, the flexible coupling also enabling relative displacement between the said members in substantially universal directions, and comprising spaced oppositely disposed mounting means secured to each of the said moving members, a flexible housing secured to the oppositely disposed mounting means, the mounting means of one of the moving members having an end portion extending into and inclosed by the mounting means of the opposite moving member, the said inclosed end portion and the inclosing mounting means of the opposite moving member having oppositely directed complemental spaced and registering recesses, flexible torque-transmitting means mounted in the said recesses, the said inclosed end portion also defining an inwardly-extending bearing surface, a thrust cylinder axially aligned with the said pair of moving members secured to the mounting means of one of the members and inclosed in but spaced from the mounting means of the opposite member having the said inwardly directed bearing surface, the said thrust cylinder terminating in an outwardly directed annular flange having a planar inwardly directed bearing surface, a thrust ring slidably mounted on the thrust cylinder and having an outwardly directed terminal flange having an outer surface defining a bearing surface complemental to the inwardly-extending bearing surface of the inclosed end portion of the said mounting means, a resilient spring on the thrust cylinder extending around the said cylinder, an annular conical inner aligning ring mounted on the spring and having opposite arcuate surfaces, and complemental aligning rings interposed between the conical aligning ring and the underside bearing surface of the outwardly directed flange on the thrust cylinder and the bearing surface on the thrust ring and the inwardly extending bearing surface of the inclosed end portion of the said mounting means, the complemental aligning rings having arcuate bearing surfaces engaging the opposite arcuate surfaces of the inner aligning ring, the said arcuate bearing surfaces providing universally movable ball and socket connections enabling selective transmission of thrust between the moving members and angular and parallel displacements therebetween.

5. Flexible coupling construction for transmitting motion between a pair of oppositely disposed rotary members, one of which is a driving member and the other of which is a driven member, the flexible coupling also enabling relative displacement between the said members in substantially universal directions, and comprising spaced oppositely disposed mounting means secured to each of the elements, a flexible housing secured to the oppositely disposed mounting means, the housing being self-adjusting responsively to thrust forces exerted on the said members in longitudinal directions, the said mounting means comprising a pair of spaced, substantially concentric cylindrical elements, one of which is inclosed in the housing and has an end portion overlappingly inclosed in the other element of the said pair, flexible key means interconnecting the overlapping portions of the said concentric cylindrical elements for transmitting rotary motion between the said rotary members while being yieldable responsively to lateral and angular displacements between the members, cylindrical thrust means mounted on the mounting means of one rotary member, and complemental instrumentalities mounted on the cylindrical thrust means and shiftable relative thereto responsive to angular and lateral displacements between the rotary members and including universally shiftable complemental ball and socket elements which are self-accommodating to the said displacements between the rotary members, the said instrumentalities being inclosed in the flexible housing.

References Cited in the file of this patent

UNITED STATES PATENTS

| | | |
|---|---|---|
| 874,926 | Behr | Dec. 31, 1907 |
| 1,623,857 | Teel | Apr. 5, 1927 |